Patented June 12, 1923.

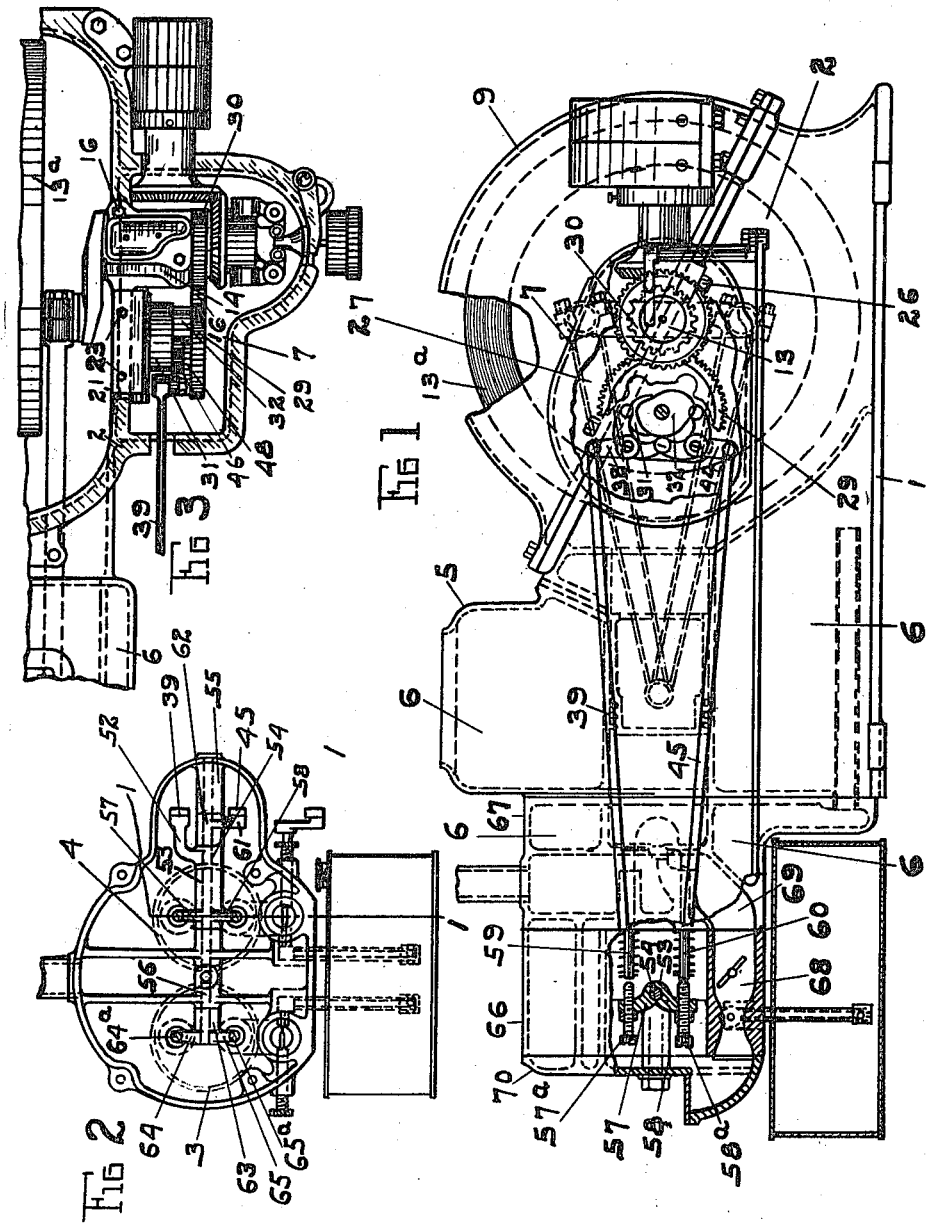

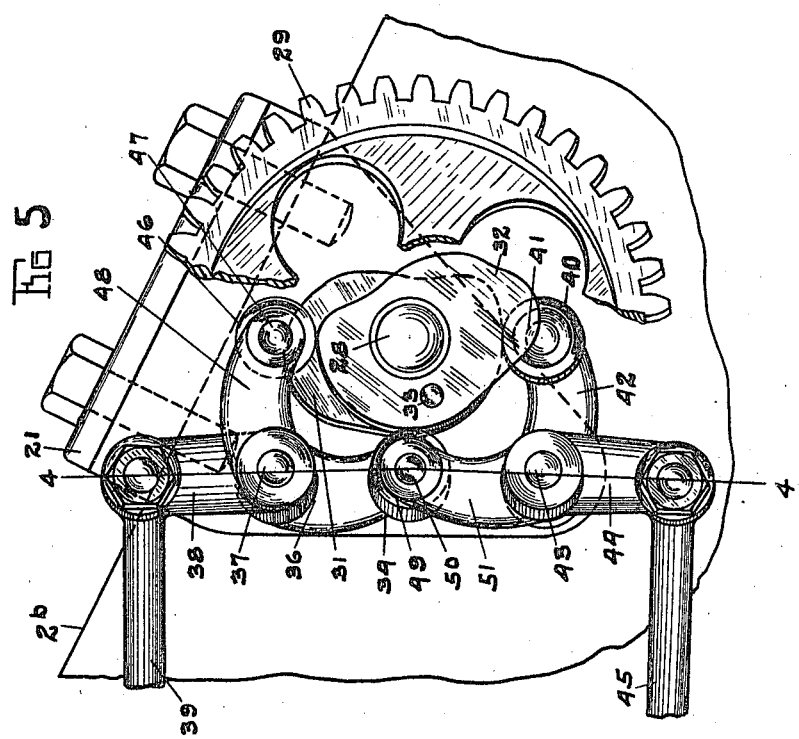
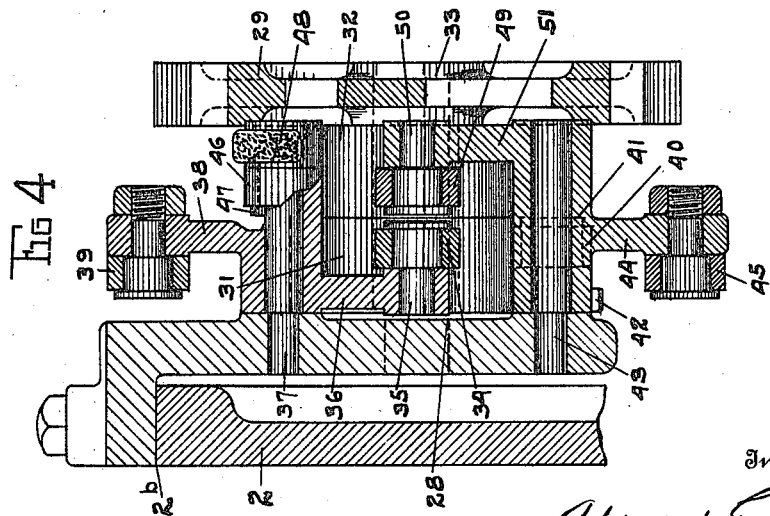

1,458,223

UNITED STATES PATENT OFFICE.

ALBERT Y. EDWARDS, OF SPRINGFIELD, OHIO.

VALVE MECHANISM FOR INTERNAL-COMBUSTION ENGINES.

Original application filed February 7, 1918, Serial No. 215,792. Divided and this application filed April 19, 1920, Serial No. 374,818.

*To all whom it may concern:*

Be it known that I, ALBERT Y. EDWARDS, a citizen of the United States, residing at Springfield, in the county of Clark and State of Ohio, have invented certain new and useful Improvements in Valve Mechanism for Internal-Combustion Engines, of which the following is a specification.

My invention relates to improvements in valve mechanism for internal combustion engines, it more particularly relating to engines of the stationary horizontal type; this application being a division of my application Ser. No. 215,792 filed February 7, 1918.

An object of my invention is to provide a valve mechanism for engines of the type referred to so arranged as to obviate the necessity of introducing any part thereof into the crank case or the cover for the crank case so as to leave the cover for the case unencumbered to permit ready accessibility to the working parts in the crank case.

A further object of my invention is to provide a valve mechanism which will be simple in construction and effective in its operation.

In the accompanying drawings:—

Fig. 1 is a side elevation of an engine embodying my improvements with a portion of the same broken away and shown in section; the section part being on the line 1—1 of Fig. 2.

Fig. 2 is an end veiw with the cover plate of the cylinder head extension removed.

Fig. 3 is a top plan view of some of the operating parts with the cover for the gear housing removed.

Fig. 4 is a section on the line 4—4 of Fig. 5.

Fig. 5 is a side elevation of a portion of the valve operating mechanism.

Referring to the drawings, 1 represents the base, 2 the crank case proper, 3 and 4 two horizontally arranged cylinders, 5 a water reservoir communicating with the water jacket 6, 7 a gear housing and 9 a removable cover for the crank case, this cover being fitted to the crank case in the manner explained in my prior application referred to, the crank shaft 13, having a fly wheel 13ª, and is journaled in suitable bearings in the casing.

Secured to the surface 2ᵇ of the crank case 2 is a bracket 21. The bracket 21 has a stud 28 on which is journaled a gear 29 which is driven from the gear 30 on the crank shaft. Rotatably connected with the gear 29 are two cams 31 and 32, the cams being locked in a certain relation to each other as well as connected to the gear by the pin 33. Cooperating with the cam 31 is a cam roller 34 on a stud 35 fixed in a finger 36 which is journaled on a stud 37 fixed in the bracket 21, the finger having connected therewith a crank arm 38 which is pivotally connected to a rod 39. Also cooperating with the cam 31 is a cam roller 40 upon a stud 41 fixed in a finger 42 which is journaled on a stud 43 also fixed in the gear bracket 21 and having integrally connected therewith a crank arm 44 pivotally connected to the rod 45. Cooperating with the cam 32 is a cam roller 46 on a stud 47 fixed in the finger 48, journaled on the stud 37 and also integrally connected with the crank arm 38. Also cooperating with the said cam 32 is a cam roller 49 journaled on the stud 50 fixed in the finger 51 which is also journaled on the stud 43 and integrally connected with the crank arm 44.

In the present construction the cam roller of each pair of cam fingers are set ninety degrees apart, the two cranks of the crank shaft are arranged 180 degrees apart, and the ratio of gearing between the crank shaft and the cam is two to one, the cams revolving one half as fast as the crank shaft.

The conformation and disposition of the cams is such that the rod 39 will be moved in one direction to open the inlet valve and in the opposite direction to open the exhaust valve of one of the cylinders while the rod 45 will be moved in one direction to open the inlet valve and in the opposite direction to open the exhaust valve of the other cylinder. The rod 39 is connected to an arm 52 integral with a sleeve or hub 53 journaled loosely on the shaft 54 which extends transversely across the heads of the cylinders 3 and 4, being journaled in bearings 55 and 56. The hub 53 has connected therewith rocker arms 57 and 58 which carry adjustable valve tappets 57ª and 58ª which are arranged in line with the valve stems 59 and 60 of the valves of the cylinder 4. The rod 45 is connected with an arm 61 on a hub 62 which is connected to the shaft 54. The shaft also has connected to its other end a hub 63 which has integrally formed arms 64 and 65 carrying adjustable valve tappets 64ª and 65ª arranged in line with the valve stems (not shown) of cylinder 3.

The shaft 54, its rocker arms and the valve tappets, as well as the bearings for the shaft, are located in a cylinder head extension 66 which is connected to the main head 67 of the cylinder and has an inlet passageway 68 for the fuel communicating with a passageway 69 in the main head; this head extension being closed by a cover 70.

By the construction of valve mechanism described, I am enabled to arrange the usual transverse shaft required to operate the valves of some of the cylinders, where a plurality of cylinders are employed, at those ends of the cylinders opposite the crank case, thus eliminating the necessity of extending such transverse shaft with its accompanying operating parts through the crank case, or through the cover, which arrangement would interfere with the construction described whereby I obtain an unencumbered cover for the crank case, or would lead to other difficulties which would make an impracticable and undesirable construction. This construction also eliminates the necessity for springs to return the valve operating devices, the devices being operated positively in both directions by the cams.

Having thus described my invention, I claim:—

1. In a gas engine, the combination of a pair of cylinders, a fly wheel located on a line extending between the cylinders, a crank shaft and casing located at one end of said cylinders, valves at the opposite end of said cylinders, valve connections, a cam shaft casing detachably secured to the crank casing at one side thereof, and a cam for operating the valve connections within said cam shaft casing.

2. In a gas engine, the combination of a pair of cylinders, a fly wheel located on a line extending between the cylinders, a crank shaft and casing centrally located, a bracketed support at one side of the crank casing, a cam shaft and operating parts on said support, valves for the cylinders, and valve connecting rods extending along one side of one cylinder to the cam shaft operating parts.

3. In a gas engine, a pair of cylinders, a crank shaft and crank casing centrally located, a fly wheel on said shaft located on a line extending between the cylinders, a supplemental casing at one side of said central casing, a cam shaft with cams supported in said latter casing, crank arms associated with said cams also supported within said casing, valve mechanism for the cylinders, and valve connecting rods operated by said crank arms.

In testimony whereof, I have hereunto set my hand this 14th day of April, 1920.

ALBERT Y. EDWARDS.

Witness:
CHAS. I. WELCH.